(12) United States Patent
Paik et al.

(10) Patent No.: US 6,242,127 B1
(45) Date of Patent: Jun. 5, 2001

(54) POLYETHYLENE SEPARATOR FOR ENERGY STORAGE CELL

(75) Inventors: Syng L. Paik, Johnson City; Robert A. Wimberly, Milligan College; Michael E. Gilchrist, Johnson City, all of TN (US)

(73) Assignee: Microporous Products, L.P., Piney Flats, TN (US)

( * ) Notice: Subject to any disclaimer, the term of this patent is extended or adjusted under 35 U.S.C. 154(b) by 0 days.

(21) Appl. No.: 09/368,908

(22) Filed: Aug. 6, 1999

(51) Int. Cl.⁷ ..................................................... H01M 2/14
(52) U.S. Cl. ........................... 429/145; 429/188; 429/304
(58) Field of Search ..................................... 429/176, 129, 429/142, 145, 188, 304, 306; 29/623.1

(56) References Cited

U.S. PATENT DOCUMENTS

| | | |
|---|---|---|
| 1,087,637 | 2/1914 | Carpenter . |
| 2,043,954 | 6/1936 | Kershaw et al. . |
| 2,046,015 | 6/1936 | Bunbury et al. . |
| 2,101,206 | 12/1937 | Wells . |
| 2,120,281 | 6/1938 | Hunt . |
| 2,478,186 | 8/1949 | Gerber . |
| 2,526,591 | 10/1950 | Szper . |
| 2,653,985 | 9/1953 | Philipps . |
| 2,747,007 | 5/1956 | Brandt . |
| 2,913,512 | 11/1959 | Sundberg et al. . |
| 2,918,518 | 12/1959 | Zablocki . |
| 2,925,456 | 2/1960 | Beusker et al. . |
| 3,020,597 | 2/1962 | Smith-Johannsen . |
| 3,158,532 | 11/1964 | Pall et al. . |
| 3,298,869 | 1/1967 | Swoboda . |
| 3,351,495 | 11/1967 | Larsen et al. . |
| 3,486,946 | 12/1969 | Duddy . |
| 3,862,861 | 1/1975 | McClelland et al. . |
| 3,894,889 | 7/1975 | Gillman et al. . |
| 3,910,799 | 10/1975 | Kondo et al. . |
| 3,968,075 | 7/1976 | Doucette et al. . |
| 3,993,566 | 11/1976 | Goldberg et al. . |
| 3,997,366 | 12/1976 | Davis, Jr. . |
| 4,086,119 | 4/1978 | Vecchiotti . |
| 4,125,187 | 11/1978 | Vecchiotti . |
| 4,197,364 | 4/1980 | Vecchiotti . |
| 4,201,838 | 5/1980 | Goldberg . |
| 4,205,122 | 5/1980 | Miura et al. . |
| 4,213,815 | 7/1980 | Goldberg et al. . |
| 4,216,281 | 8/1980 | O'Rell et al. . |
| 4,224,394 | 9/1980 | Schmidt . |
| 4,226,926 | 10/1980 | Goldberg et al. . |

(List continued on next page.)

FOREIGN PATENT DOCUMENTS

| | | |
|---|---|---|
| 0121 169A1 | 10/1984 | (EP) . |
| 486641 | 6/1938 | (GB) . |
| 591633 | 8/1947 | (GB) . |
| 719400 | 12/1954 | (GB) . |
| 770915 | 3/1957 | (GB) . |
| 778001 | 7/1957 | (GB) . |
| 817 079 | 7/1959 | (GB) . |
| 880739 | 10/1961 | (GB) . |
| 1 046 551 | 10/1966 | (GB) . |
| 1050479 | 12/1966 | (GB) . |
| 1 553 302 | 9/1979 | (GB) . |
| 2169129A | 7/1986 | (GB) . |

OTHER PUBLICATIONS

DE 354 5615 Johnson et al. Jul. 10, 1986 (abstract only).

*Primary Examiner*—Carol Chaney
*Assistant Examiner*—Mark Ruthkosky
(74) *Attorney, Agent, or Firm*—Luedeka, Neely & Graham

(57) ABSTRACT

An improved separator for an energy storage cell is described which is made of a porous polyolefin matrix and contains from about 0.5 to about 30 dry weight percent particulate filler. The particulate filler is a cured, porous rubber material which enhances the electrochemical properties of the separator as compared to conventional polyolefin separators.

24 Claims, 2 Drawing Sheets

U.S. PATENT DOCUMENTS

| | | |
|---|---|---|
| 4,237,083 | 12/1980 | Young et al. . |
| 4,245,689 | 1/1981 | Grard et al. . |
| 4,288,503 | 9/1981 | Goldberg . |
| 4,327,164 * | 4/1982 | Feinberg ............................. 429/144 |
| 4,448,862 | 5/1984 | Schulte et al. . |
| 4,681,750 | 7/1987 | Johnson et al. . |
| 4,855,196 | 8/1989 | Eggers . |
| 5,154,988 | 10/1992 | Choi et al. . |
| 5,180,647 | 1/1993 | Rowland et al. . |
| 5,221,587 | 6/1993 | Böhnstedt et al. . |
| 5,277,763 * | 1/1994 | Debaux ............................. 462/145 |
| 5,895,732 | 4/1999 | Clough . |
| 6,057,061 * | 5/2000 | Callahan ............................. 429/249 |

* cited by examiner

POLYETHYLENE SEPARATOR FOR ENERGY STORAGE CELL

FIELD OF THE INVENTION

The invention relates to energy storage cell separators and in particular to microporous separators for use in energy storage cells which exhibit improved physical and electrochemical properties in energy storage cell applications.

BACKGROUND OF THE INVENTION

Rechargeable energy storage cells are used in a variety of applications including gas operated motor vehicles and electric vehicles. Of the applications, electric vehicles such as golf carts, fork trucks, marine applications, floor-sweeper scrubber and recreational vehicles and the like are the most demanding in terms of charge/discharge cycles. Energy storage cells for such electric vehicles are commonly known as "deep cycle" batteries which provide relatively steady power over extended periods of time between charging and which operate in a deep cycling mode of severe discharging as well as daily recharging cycles. Deep cycle energy cells are desirably recharged with little or no supervision. Accordingly, the cells must be capable of multiple charge/discharge cycles without significantly degrading of the power output properties of the cells. Conventional rechargeable energy storage cells have properties which do not lend themselves to the rigorous duty cycles of the deep cycle batteries.

Most energy storage cells of the nature described above contain positive plates or grids made of lead-antimony alloys which are easier to cast and produce stronger electrodes. The antimony also improves the corrosion resistance of the positive plate to acid attack and increases the ability of the battery to recovery from deep discharge cycles. However, during overcharge and other forces in the cells, the antimony tends to oxidize and dissolve out of the lead alloy plates. Once dissolved in the electrolytic solution, the antimony compound travels through the separator between the positive and negative plates and deposits or plates out on the surface of the negative plate. This layer of antimony oxide tends to reduce the active surface area of the negative plate and thereby reduce the capacity and voltage behavior of the battery. Overcharge of the energy cell is more likely to occur because the cell's charge voltage has decreased which further exacerbates the deposition of antimony oxide and lowering of charge voltage which hastens the deterioration of the life of the energy cell. Antimony also tends to cause a lowering of the hydrogen overvoltage which can lead to the formation of undesirable quantities of hydrogen gas in the energy cell. In order to inhibit the antimony transfer from the positive to the negative plates, rechargeable deep cycle energy cells preferably include separators which exhibit the ability to retard antimony transfer to the negative plates and which give high end of charge voltage as well as reduce or prevent dendrite growth in the cells.

There are several types of separators which are commercially used in rechargeable energy cells. The separators differ by the material composition and include rubber separators, polymeric separators such as polyethylene separators, polyvinyl chloride (PVC) separators, phenolic resorcinol separators, fiberglass separators and resin impregnated cellulosic paper separators. The separators are further classified as microporous separators and macroporous separators. The microporous separators include separators made of natural rubber, polyethylene, phenolic resin, PVC and polymeric membranes. Macroporous separators include separators made of glass fiber mats, sintered PVC and resin-impregnated cellulosic papers. Of the foregoing, microporous, natural rubber separators typically exhibit the best electrochemical performance characteristics which enhance the overall performance of the energy cell.

Because of the inherent limitations of rubber separators, attempts have been made to use more flexible polyolefin separators. U.S. Pat. No. 3,351,495 to Larsen et al. describes a conventional microporous polyolefin separator which contains a microporous sheet of polyolefin having a molecular weight of at least 3,000,000 and which contains 7 to 92 volume percent filler. The filler is said to be selected from carbon black, coal dust, graphite, metal oxides and hydroxides, metal carbonates, minerals, synthetic and natural zeolites, portland cement, precipitated metal silicates, alumina silica gels, wood flour, wood fibers, bark products, glass particles, and salts. The preferred filler is said to be finely divided synthetic, precipitated silica.

U.S. Pat. No. 4,237,083 to Young et al. describes a process for making a microporous sheet by forming a blend of polyolefin, silica and a water insoluble plasticizer, forming a sheet from the blend and contacting the sheet with water for a time sufficient to render the sheet microporous. The resulting sheet material is said to have good electrical resistance characteristics.

There are two primary functional aspects of separators used for energy cells, one is physical and the other electrochemical. The important physical characteristics include high porosity, small mean pore diameter, oxidation resistance, puncture resistance, thermal dimensional stability and low levels of harmful chemical contaminants. Electrochemical characteristics of importance include favorable voltage characteristics, retardation of antimony transfer, acceptable Tafel behavior, and prevention of dendrite growth. The Tafel behavior of an energy storage cell is a determination of the hydrogen and oxygen over-potential shifts in the cell electrolyte compared to pure acid solutions. The electrochemical compatibility test enables a prediction of the long term effect of chemical residues leached into the electrolyte from the separators.

Despite the advances made in the art with respect to improved separators, there continues to be a need for separators for energy storage cells which exhibit improved physical and electrochemical properties over conventional polyethylene separators.

SUMMARY OF THE INVENTION

With regard to the above, the invention provides a separator for an energy cell which includes a porous polyolefin matrix containing from about 0.5 to about 30 weight percent particulate filler based on the dry weight of the mixture. The particulate filler includes a cured rubber particulate material.

In another aspect, the invention provides a method for making a separator for an energy-cell which includes mixing a thermoplastic polyolefin material, from about 40 to about 80 dry weight percent precipitated silica, from about 0.5 to about 30 dry weight percent particulate filler containing cured rubber and an amount of mineral oil sufficient to form a powdery premix. The powdery premix is fed to the extruder hopper through the use of a loss in weight feeder. An additional amount of mineral oil is fed to the extruder down stream of the hopper to form an extrudable mixture. The mixture is extruded at a temperature sufficient to form a substantially homogeneous web having a polyolefin matrix. Once the web is formed, from about 80 to about 90 percent by weight of the mineral oil is extracted from the web in order to provide a residual mineral oil content preferably ranging from about 10 to about 20 wt. %.

Another aspect of the invention provides an essentially maintenance free energy storage cell which includes a cell container made of a corrosion resistant material, at least one positive electrolytic plate and at least one negative electrolytic plate disposed in the container, an acidic electrolyte solution or gel filling the container and wetting at least a portion of the positive and negative plates thereby forming an electrolytic cell and a microporous separator disposed between the positive plate and negative plates, the separator including a porous polyolefin matrix containing from about 0.5 to about 30 percent by dry weight particulate filler which contains cured rubber.

The separators according to the invention exhibit improved electrochemical properties as compared to conventional polyolefin separators. The separators according to the invention also exhibit improved electrical properties as compared to polyvinyl chloride (PVC) separators, phenolic resin/silica separators, resin impregnated cellulosic paper separators and glass fiber separators. Although rubber tends to reduce the porosity of a polyethylene separator, the cured rubber component which is incorporated into the polyolefin matrix of the separator according to the invention exhibits improvement in the recharge properties of the energy cell and is expected to prolong the energy cell life. While not wishing to be bound by theory, it is believed that the prolonged life effect is due to the cured rubber component's ability to impart similar electrochemical effects to that of conventional natural rubber-based separators.

BRIEF DESCRIPTION OF THE DRAWINGS

Further advantages of the invention will become apparent by reference to the detailed description when considered in conjunction with the figures, which are not to scale, wherein like reference numbers indicate like elements through the several views, and wherein.

DETAILED DESCRIPTION OF THE PREFERRED EMBODIMENTS

Figure 1:
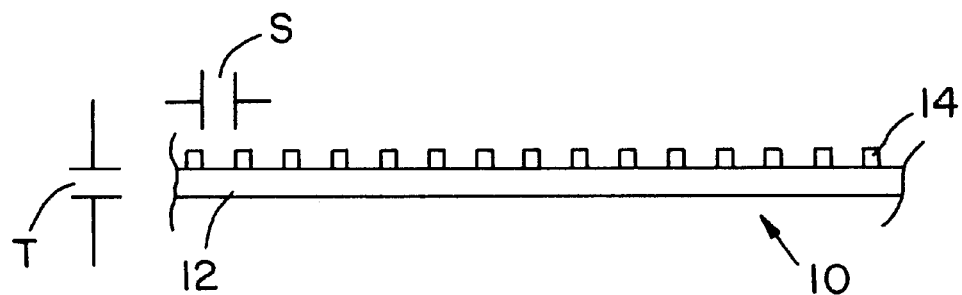
FIG. 1 is a cross-sectional view, not to scale of a separator according to the invention.
Figure 2:
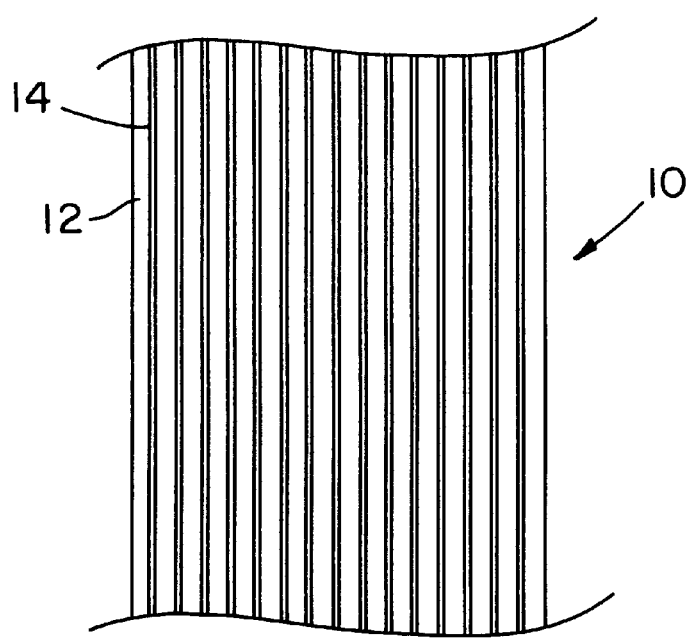
FIG. 2 is a plan view, not to scale, of a separator according to the invention.

With reference to FIGS. 1 and 2, the invention provides a separator 10 for use in a rechargeable energy cell such as a lead-acid battery which may be sealed or unsealed, starved or flooded, for separating a positive plate from a negative plate. The separator 10 is preferably made of a polyolefin material, preferably a high molecular weight polyolefin material, most preferably an ultra-high molecular weight polyolefin material selected from polyethylene, polypropylene, polybutene, copolymers of ethylene and propylene and copoylmers of ethylene and butene. The polyolefin preferably has an average molecular weight ranging from about 3,000,000 to about 6,000,000 g/mole and a melt index of about 0. Particularly preferred polyolefins are ultra-high molecular weight polyethylene (UHMWPE) available from Ticona of League City, Texas under the trade name HOSTALEN GUR 4120, 4130 AND 4150.

The polyolefin is formed into a separator by extruding a mixture of polyolefin and fillers through an extruder. An important component of the filler used in the mixture to be extruded is a porous particulate material containing cured rubber. The term "cured" means the rubber is cross-linked by conventional means such as by chemical curing agents or by is cured by ultraviolet or electron-beam curing techniques. Chemical curing agents may be selected from sulfur or dibenzoyl peroxide or may be selected from cure accelerators including, but not limited to, dicumyl peroxide, p-quinone dioxime, 1,3-diphenylguanidine, ethylenethiourea (2-imidazolidinethione), tetramethylthiuram disulfide, tetramethylthiuram monosulfide, trinitrobenzene, chloranilphenolic-resins, 4,4'-dithiobismorpholine, dithiophosphates such as zinc O,O-di-n-butylphosphorodithioate and benzothiazoles such as 2-mercaptobenzothiazole, bis(2, 2-benzothiazolyl) disulfide, N-tert-butyl-2-benzothiazolesulfenamide, N-cyclohexyl-2-benzothiasolesulfenamide, 2-(4-morpholinylthiobenzothiazole) and 2-(4-morpholinylditho) benzothiazole. Various retarders, antioxidants and stabilizers may also be used to control the cure rate and the resulting final properties of the rubber. The amount of chemical cure agent added to rubber may range from about 20 to about 45 weight percent based on the weight of elastomer in the mixture.

The rubber is preferably a natural or synthetic rubber. Natural rubber may be selected from latex grades such as ribbed smoked sheet, white and pale crepes, pure blanket crepes, estate brown crepes, compo crepes, thin brown crepes or remills, thick brown crepes or ambers and flat bark crepes. Commercial grades of Hevea natural rubber typically contain about 93–95 wt. % cis-1,4-polyisoprene. Other types of Hevea rubber include superior-processing, technically classified, air-dried sheet, skim, deprotenized natural rubber, oil-extended natural rubber, heveapolus MG and epoxidized natural rubber.

Synthetic rubber may be selected from polybutadiene, polyisoprene, styrene-butadiene, nitrile, butyl, ethylene-propylene terpolymer, ethylene-propylene copolymer, silicone, polysulfides, polyacrylate, epichlorohydrin, fluoroelastomers, chlorosulfonated polyethylene, halogenated butyl, chlorobutyl, bromobutyl, chlorinated polyethylene, polyurethane and thermoplastic rubbers. Of the natural and synthetic rubbers, the most preferred is ribbed smoked sheet.

A particularly preferred source of cured rubber is porous web separator containing cured natural latex rubber and precipitated silica filler available from Microporous Products, L.P. of Piney Flats, Tennessee under the trade names ACE-SIL or FLEX-SIL. The ACE-SIL separator is made by mixing natural rubber, rehydrated precipitated silica and sulfur together in an internal mixer and then extruding and calendering the web to produce a ribbed web of the desired thickness. The compounding, mixing and calendering procedures and composition of the FLEX-SIL separators are similar to the ACE-SIL separators except that the rubber is cured by an electron beam processor rather than vulcanizing the rubber with sulfur. The main differences between the ACE-SIL separators and the FLEX-SIL separators is the pore diameter and the flexibility of the FLEX-SIL separators.

The porous web separator used as a source of cured rubber is preferably ground to provide a particular filler for the polyolefin separator which contains cured rubber and silica. The particle size of the ground separator web preferably ranges from about 10 to about 100 microns and the ground particles may have regular or irregular shapes depending on the grinding technique used. Grinding may be accomplished by use of a ball mill or other conventional grinding, comminuting or pulverizing techniques including ring roller mills, hammer mills and disk mills. The ground web particles containing cured rubber preferably exhibit an average pore diameter ranging from about 0.05 to about 1.0 micron and exhibit a porosity of at least about 40% void volume.

It is preferred to include silica particles in addition to the polyolefin and particulate filler. The silica particles are preferably used in an amount ranging from about 45 to about 80 percent by weight of the mixture fed to the extruder hopper. A particularly preferred source of silica particles is precipitated silica, available from PPG Industries, Inc. of Pittsburgh, Pa. under the trade names HI-SIL SBG, HI-SIL WB-10 and HI-SIL WB-15.

Another component of the mixture to be extruded is a mineral oil. The mineral oil and silica components are the primary materials used to form the pore structure in the polyolefin separator. The mineral oil also reduces dusting in the feed hopper. During the manufacturing process for the polyolefin web, a portion of the mineral oil is premixed with the polyolefin pellets or granules and the particulate filler material to form a powdery mixture which is fed into the hopper of an extruder. A second portion of mineral oil is fed into the extruder once the powdery mixture has been heated and sufficiently melted. The amount of mineral oil component in the extruded polyolefin web preferably ranges from about 40 to about 80 weight percent based on the total weight of the mixture of polyolefin, particulate filler and oil. The portion of mineral oil used to form the powdery mixture is preferably about 80 to about 90% by weight of the total mineral oil used in the formulation. A particular preferred mineral oil is available from Shell Chemical Company of Houston, Tex. under the trade name SHELLFLEX 3681.

The mixture to be extruded may also contain conventional ingredients including but not limited to coloring agents, antioxidants, processing aids and the like. A suitable coloring agent is a neutral carbon black pigment available from Engineering Carbons of Port Neches, Texas under the trade name NEOTEX N-326. A preferred antioxidant is available from Ciba-Geigy Corporation of Tarrytown, N.Y. under the trade name IRGANOX B215. A preferred processing oil is available from Ferro Corporation of Walton Hills, Ohio under the trade name PETRAC CZ-81. The conventional ingredients preferably comprise a total of less than about 1% by weight of the mixture.

The extruder is preferably a heated screw extruder, most preferably a twin screw heated extruder such as an extruder available from Werner Pfliederer under the trade name ZSK. The extruder preferably has two 3.5 inch co-rotating screws turning at about 300 rpm. The barrel of the extruder is preferably heated and the temperature is controlled in from 5 to 7 individual heating zones along the length of the extruder at conventional polyethylene extrusion temperatures, with a final extrusion zone temperature of about 230° C. A substantially homogeneous elongate web of polyolefin, particulate filler and mineral oil is extruded through the extruder die. The extruded web 12 preferably has thickness T after calendaring of from about 0.13 millimeters to about 0.80 millimeters and preferably contains a plurality of upstanding longitudinal, substantially parallel ribs 14 having a rib height of from about 0.25 millimeters to about 6 millimeters. Spacing S between the ribs may range from about 2 to about 5 millimeters or more.

Once the web is extruded, it is cooled under a room temperature environment as the web is conveyed to the extraction process where a portion of the mineral oil is extracted from the web by contacting the extruded web with a solvent which is compatible with the mineral oil. The amount of mineral oil remaining in the web after the extraction step preferably ranges from about 10 to about 20 weight percent of the finished web. Solvents useful for extracting the mineral oil may be selected from a chlorinated hydrocarbon solvent such as trichloroethylene, tetrachloroethylene, carbon tetrachloride, methylene chloride, tetrachloroethane, and the like, hydrocarbon solvents such as hexane, benzene, petroleum ether, toluene, cyclohexane, gasoline and the like.

In order to extract the portion of mineral oil from the web, the web is sprayed or dipped or otherwise contacted with, preferably dipped in, soaked in or pulled through a vessel containing the solvent for a time sufficient to extract the desired quantity of mineral oil from the web leaving preferably from about 10 to about 20 weight percent mineral oil in the web. The web is then dried for a period of time sufficient to remove substantially all of the solvent from the web and dry the web. Once dried, the web may then be rolled onto a reel and/or cut to the size desired for the separators.

The polyolefin web made according to the foregoing procedure is preferably porous. The porosity of the web may be determined by the mercury intrusion method described by Ritter, H. L., and Drake, L. C, in *Ind. Eng. Chem. Anal. Ed.*, Vol 17, page 787 (1945). According to the method, mercury is forced into different sized pores by varying the pressure exerted on the mercury, i.e., low pressure being used to fill large sized pores and higher pressures being used to fill small sized pores. The total pore volume is then determined and the pore volume distribution calculated from a measure of mercury in the various sized pores and the pressure exerted. It is preferred that the web have a porosity ranging from about 0.6 to about 2.0 cubic centimeters per gram by the mercury intrusion method.

The individual battery separators 10 which may be cut from the elongate web preferably have a length ranging from about 30 to about 1200 millimeters, a width ranging from about 30 to about 650 millimeters and a thickness ranging from about 1 to about 7 millimeters. The length and width of the web 10 is not critical to the invention and thus may vary within wide limits depending on the size energy cell in which the separator 10 is used. The separator material may also be provided in continuous roll form for custom cutting to various individual separator sizes.

In order to evaluate the improvement in electrical properties exhibited by the improved separators according to the invention, an antimony suppression analysis method was used to indicate the separator's ability to negate the effect of antimony contamination of the lead electrodes of an energy storage cell. According to the method, multiple pure lead rods were charged/discharged cycled in 1.265 specific gravity sulfuric acid over a 72 hour period by applying repetitive cyclical potential scans to the lead rod electrodes between the potentials of −820 mV and −1140 mV at a scan rate of 1 mV/sec in order to increase the surface area of the lead rods.

Figure 3:
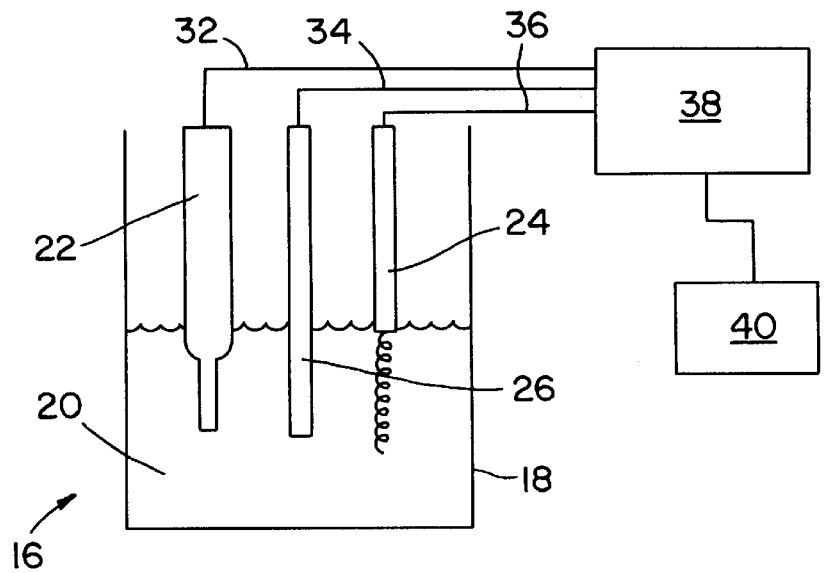
FIG. 3 is a simplified diagram of an antimony suppression analysis cell.

A simplified sketch of a device suitable for antimony suppression analysis is shown in FIG. 3. The device 16 includes a container 18 for holding leachate solution 20. A reference electrode 22 of the mercury-mercurous sulfate type, a pure lead wire used as a counter electrode 24 and a pure lead working electrode 26 are all immersed in the leach solution 20. Each of the electrodes 22, 24 and 26 are electrically connected via electrical conduits 32, 34 and 36 to a potentiostat-galvanostat 38 which is used to impose varying voltages and currents on the electrodes as described in more detail below. A recording plotter or computer 40 may be connected to the potentiostat-galvanostat 38 to record applied voltage and charge/discharge currents and coulombs.

Individual samples of the separator webs (10 grams each cut from the webs to be tested) were refluxed or heated at 160° F. (71° C.) in 800 mL of 1.265 specific gravity sulfuric acid for a period of seven days. The leach solution was collected and a 30% by volume solution of the leach solution and pure 1.265 specific gravity sulfuric acid was prepared.

An antimony suppression analysis cell 16 was assembled as described above with reference to FIG. 3 by placing one of the cycled lead rods as a working electrode along the mercury-mercurous sulfate reference electrode and a pure lead wire counter electrode in the 30% by volume leach solution. The working electrode was cycled between –820 mV and –1140 mV at a linear potential scan rate of 1 mV/sec and the charge reaction peak at about –990 mV and the discharge peak at about –910 mV was observed and recorded. The electrode was cycled for about 12 hours at the foregoing scan rate then the scan rate was reduced to 0.5 mV/sec. Charge coulombs and discharge coulombs were measured and recorded. Coulombic charge efficiency was determined by dividing the discharge coulomb value by the charge coulomb value which was expressed in percentage charge efficiency.

Using the same cell assembly 16, the electrolyte solution was spiked or contaminated by adding 5 ppm of antimony from a 1000 ppm antimony standard typically used for making calibration curves for atomic absorption analyses. The cell 16 was then cycled at the 1 mV/sec and 0.5 mV/sec rates as described above and the coulombic charge efficiencies of the spiked electrolytes were determined. The same procedure was repeated for an additional 5 ppm of antimony for a total of 10 ppm antimony, for an additional 10 ppm of antimony for a total of 20 ppm antimony. The coulombic charge efficiencies versus antimony contaminant level for each of the separator materials was recorded and compared for the complete series of 1 to 20 ppm antimony levels.

Figure 4:
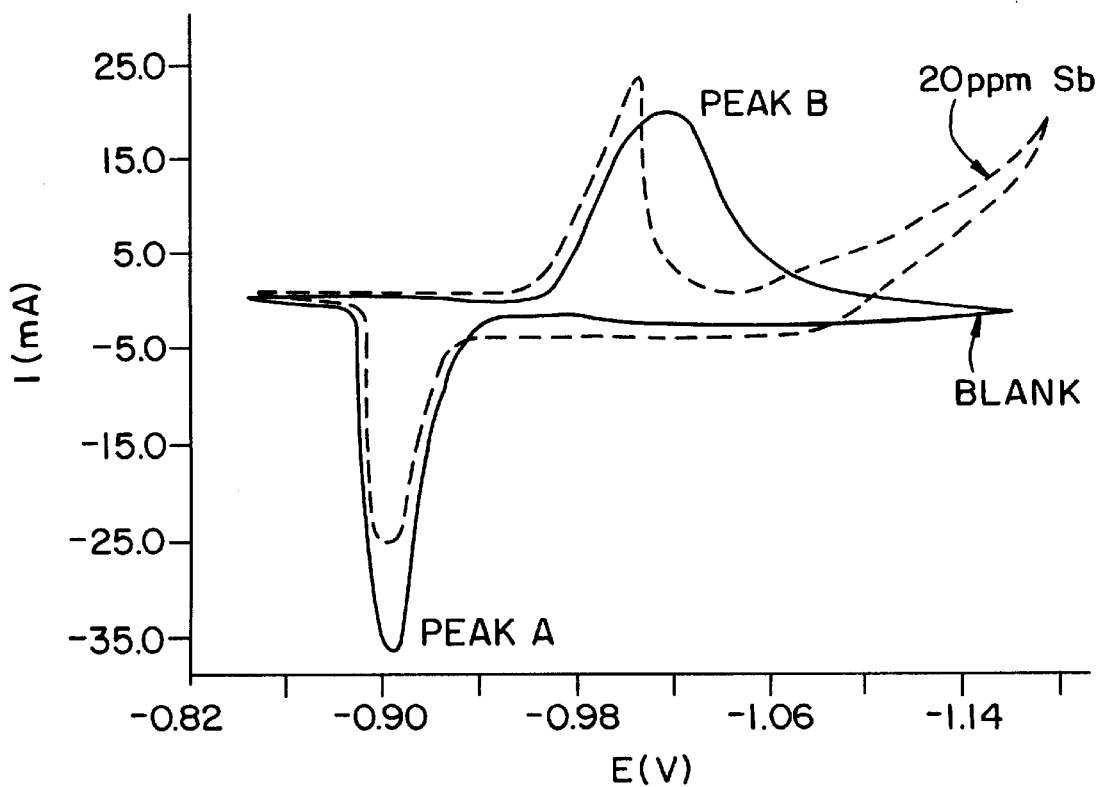
FIG. 4 is a diagram of a typical charge/discharge efficiency plot.

Typical charge/discharge efficiency plots for test cell 16 containing a leachate from a separator according to the invention are shown in FIG. 4. Peaks A represent the discharge currents after cycling and peaks B represent the charge currents after cycling. Peaks A demonstrate the loss in discharge coulombs as the cell is spiked with antimony in the 20 ppm range as compared to a blank solution containing 0 ppm antimony while peaks B demonstrate the increase in charge coulombs that are the result of the evolution of hydrogen gas at the working electrode surface. These effects represent the same basis phenomenon that occurs at the negative electrode in a typical lead acid battery and can therefore be useful in predicting the separator influence on these properties.

The following example is given for the purpose of illustrating various aspects of the invention and is not intended to limit the invention in any way.

EXAMPLE

A polyethylene separator was made by feeding a mixture containing 100 parts by weight ultra-high molecular weight polyethylene (GUR 4120), 320 parts by weight precipitated silica (HI-SIL SBG), 150 parts by weight ACE-SIL dust having an average particle size of about 100 microns, 5 parts by weight carbon black (NEOTEX N-326), 1.4 parts by weight antioxidant (IRGANOX B215), 1.4 parts by weight processing aid (PETRAC CZ-81) and 750 parts by weight mineral oil (SHELLFLEX 3681) to the solids feed hopper of a twin screw heated extruder (ZSK extruder) having two 3.5 inch co-rotating screws turning at 300 rpm and five heater zones each maintained at conventional polyethylene extrusion temperatures, with a fmal extrusion zone temperature of 230° C. Additional mineral oil, 150 parts by weight, was fed to the extruder downstream of the solids feed hopper. Once the web was extruded, it was cooled at room temperature as it was conveyed to the extraction process where a portion of the mineral oil was extracted from the web by contacting the extruded web with trichloroethylene (TCE). After drying, the resulting web contained 14.7 dry weight percent polyethylene, 47.1 dry weight percent precipitated silica, 22.1 dry weight percent ACE-SIL dust, 15 dry weight percent mineral oil, 0.7 dry weight percent carbon black, 0.2 dry weight percent antioxidant and 0.2 dry weight percent processing aid. The properties of a web made according to the foregoing procedure are contained in the following table under the heading "Separator according to the invention".

The following table lists the properties of a separator of the invention made according to the above example and a conventional, commercially available polyethylene separator from JUNGFER Gesellschaft m.b.H. & Co. KG of Feistritz, Austria.

TABLE

| Separator Characteristics | Separator according to invention | Conventional PE separator |
| --- | --- | --- |
| Overall Thickness (mm) | 2.0 | 2.0 |
| Backweb thickness (mm) | 05. to 0.6 | 0.5 to 0.6 |
| Electrical Resistance (mOhm/dm$^2$) | 2.0 | 1.9 |
| Tensile Strength (N/mm$^2$) | | |
| Machine direction (MD) | 5.6 | 5.5 |
| Cross Machine direction (CMD) | 4.9 | 5.9 |
| Elongation (%) | | |
| Machine direction (MD) | 668 | 578 |
| Cross Machine direction (CMD) | 403 | 321 |
| Puncture (kg force) | 0.55 | 0.68 |
| Acid Weight Loss (%) | 3.4 | 3.6 |
| Chromic Acid Oxidation Wt. Loss (%) | 4.4 | 4.6 |
| Shrinkage (%) | <1 | <1 |
| Volume Porosity (%) | 50 to 60 | 55 to 65 |
| Mercury Intrusion Porosimetry | | |
| Total Porosity (cc/g) | >0.80 | >1.00 |
| Mean Pore Size (m) | 0.120 | 0.100 |
| Electrochemical Compatibility Test | pass | pass |
| Oil Content (Wt. %) | 15 to 20 | 15 to 20 |
| Charge efficiency (%) | | |
| 0 ppm antimony | 91.5 | 92.0 |
| 5 ppm antimony | 70.0 | 38.0 |
| 10 ppm antimony | 37.5 | 29.5 |
| 20 ppm antimony | 12.5 | 5.0 |
| Negative Plate Voltage vs Cycles | | |
| 20 cycles | 1.314 | 1.292 |
| 30 cycles | 1.320 | 1.291 |
| 40 cycles | 1.318 | 1.286 |
| 50 cycles | 1.315 | 1.287 |
| 70 cycles | 1.295 | 1.250 |
| 100 cycles | 1.310 | 1.110 |
| TOC Current Acceptance vs Cycles | | |
| 20 cycles | 3.4 | 4.2 |
| 30 cycles | 3.6 | 7.0 |
| 40 cycles | 3.2 | 4.1 |
| 50 cycles | 3.8 | 4.8 |
| 70 cycles | 6.0 | 22.0 |
| 100 cycles | 6.5 | 25.0 |

As shown by the foregoing table, a polyethylene separator containing the cured rubber particles exhibits substantially higher charge efficiency, i.e. better antimony suppression, than a comparable polyethylene separator which does not contain cured rubber particles over the range of antimony contaminant ranging from about 5 to about 20 ppm. Accordingly, it would be expected that the separator according to the invention would perform substantially better than a conventional polyethylene separator for its intended application.

Having described various aspects and embodiments of the invention and several advantages thereof, it will be recognized by those of ordinary skills that the invention is susceptible to various modifications, substitutions and revisions within the spirit and scope of the appended claims.

What is claimed is:

1. A battery separator comprising a porous polyolefin matrix containing from about 0.5 to about 30 dry weight percent porous particulate filler, wherein said filler contains cured rubber and wherein said cured rubber has a porosity of at least about 40% void volume.

2. The battery separator of claim 1 wherein the cured rubber comprises vulcanized rubber.

3. The battery separator of claim 2 wherein the cured rubber has an average pore diameter ranging from about 0.05 to about 1.0 micron.

4. The battery separator of claim 1 wherein the particulate filler comprises a porous particulate mixture of cured rubber and silica.

5. The battery separator of claim 2 wherein the particulate filler further comprises particulate porous silica.

6. The battery separator of claim 1 wherein the particulate filler comprises cured natural rubber.

7. The battery separator of claim 1 wherein the polyolefin comprises an ultra high molecular weight polyethylene.

8. A method for making a battery separator for an energy-cell which comprises, mixing a thermoplastic polyolefinic material, from about 40 to about 80 dry weight percent precipitated silica, from about 0.5 to about 30 dry weight percent particulate filler containing cured rubber and an amount of mineral oil sufficient to form a powdery premix, feeding the powdery premix to feed hopper of a twin screw extruder, providing additional mineral oil to the extruder downstream of the feed hopper to form an extrudable mixture, extruding the mixture at a temperature sufficient to form a substantially homogeneous web having a polyolefin matrix, and extracting mineral oil from the web to a residual mineral oil content of from about 10 to about 20 percent by weight, whereby a polyolefin web having an average porosity ranging from about 0.6 to about 2.0 cubic centimeters/gram as determined by a mercury intrusion method is provided.

9. The method of claim 8 wherein the cured rubber comprises vulcanized rubber.

10. The method of claim 9 wherein the particulate filler comprises porous particulate.

11. The method of claim 10 wherein the cured rubber has an average pore diameter ranging from about 0.05 to about 1.0 micron.

12. The method of claim 10 wherein the cured rubber has a porosity of at least about 40% void volume.

13. The method of claim 8 wherein the particulate filler comprises a porous particulate mixture of cured rubber and silica.

14. The method of claim 9 wherein the particulate filler comprises a mixture of vulcanized rubber and porous silica.

15. The method of claim 8 wherein the rubber filler comprises cured natural rubber.

16. The method of claim 9 wherein the polyolefin comprises an ultra high molecular weight polyethylene.

17. The method of claim 8 further comprising grinding a porous web containing cured rubber and silica to a particle size ranging from about 10 to about 100 microns to provide the particulate filler.

18. A rechargeable energy storage cell which comprises a cell container made of a corrosion resistant material, at least one positive electrolytic plate and at least one negative electrolytic plate disposed in the container, an acidic electrolyte solution or gel filling the container and wetting at least a portion of the positive and negative plates thereby forming an electrolytic cell and a microporous separator disposed between the positive and negative plates, the separator comprising a porous polyolefin matrix containing from about 0.5 to about 30 dry weight percent porous particulate filler, wherein said particulate filler contains cured rubber and wherein said cured rubber has a porosity of at least about 40% void volume.

19. The storage cell of claim 18 wherein the cured rubber comprises vulcanized rubber particulate.

20. The storage cell of claim 19 wherein the cured rubber has an average pore diameter ranging from about 0.05 to about 1.0 micron.

21. The storage cell of claim 18 wherein the particulate filler comprises a porous particulate mixture of cured rubber and silica.

22. The storage cell of claim 19 wherein the particulate filler further comprises particulate porous silica.

23. The storage cell of claim 18 wherein the cured rubber comprises cured natural rubber.

24. The storage cell of claim 18 wherein the polyolefin comprises an ultra high molecular weight polyethylene.

* * * * *